(12) United States Patent
Mamaghani

(10) Patent No.: US 6,498,930 B1
(45) Date of Patent: Dec. 24, 2002

(54) METHOD FOR AUTOMATICALLY PROGRAMMING A WIRELESS TELEPHONE WITH A VOICE MAIL SYSTEM ACCESS NUMBER

(75) Inventor: Farzan Mamaghani, Bothell, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/324,486

(22) Filed: Jun. 2, 1999

(51) Int. Cl.$^7$ .............................................. H04M 11/10
(52) U.S. Cl. ....................... 455/413; 455/419; 455/550; 455/564
(58) Field of Search ................................ 455/413, 412, 455/418, 419, 550, 575, 563, 564; 379/88.22, 88.18

(56) References Cited

U.S. PATENT DOCUMENTS

| | | | |
|---|---|---|---|
| 5,276,729 A | | 1/1994 | Higuchi et al. |
| 5,568,540 A | * | 10/1996 | Greco et al. ................... 379/89 |
| 5,758,279 A | | 5/1998 | Foti |
| 5,930,703 A | * | 7/1999 | Cairns ......................... 455/418 |
| 6,032,039 A | * | 2/2000 | Kaplan ......................... 455/413 |

FOREIGN PATENT DOCUMENTS

| | | |
|---|---|---|
| EP | 0630167 A | 12/1994 |
| GB | 2249459 A | 5/1992 |

OTHER PUBLICATIONS

European Search Report dated Oct. 12, 2000 regarding European Patent Application No. 00302848.7, 3 pages.

* cited by examiner

*Primary Examiner*—Doris H. To
(74) *Attorney, Agent, or Firm*—Kenyon & Kenyon

(57) ABSTRACT

A method for automatically programming a wireless telephone with a voice mail system access telephone number is disclosed. When the voice mail system access telephone number is received by the wireless telephone, software within the wireless telephone automatically stores the received voice mail system access telephone number within a wireless telephone memory location.

8 Claims, 1 Drawing Sheet

METHOD FOR AUTOMATICALLY PROGRAMMING A WIRELESS TELEPHONE WITH A VOICE MAIL SYSTEM ACCESS NUMBER

BACKGROUND

The present invention relates to programming a wireless telephone. More particularly, the present invention relates to a method for automatically programming a wireless telephone with a telephone number such as a voice mail system access telephone number.

Currently, a wireless telephone requires activation before the wireless telephone may be used to initiate and receive telephone calls within a wireless telephone network. Over the air activation (OAA) is one known example of a method for activating a wireless telephone. In accordance with OAA, a wireless telephone customer first uses a wired telephone connected to a network such as the public switched telephone network (PSTN) to complete a telephone call to a wireless telephone service provider. A representative for the wireless telephone service provider then prompts the customer for identification information. Upon authenticating the received identification information, the representative then instructs the customer to "turn on" the wireless telephone. Once the customer turns the wireless telephone on, the representative initiates a sequence of events which results in the wireless telephone service provider transmitting activation information through the air (in a known manner, for example, from a base station within the service provider's wireless telephone network) to the wireless telephone. This activation information may include, for example, an intelligent roaming database (IRDB) which enables the wireless telephone to select proper channels during operation, a mobile identification number (MIN) which represents the wireless telephone's newly assigned telephone number, an authentication number, and data which enables the wireless telephone to implement specific services previously selected by the customer. Once the activation information is received by the wireless telephone, the wireless telephone is active and may function to initiate and receive calls. One of the services frequently chosen by wireless telephone customers is voice mail. Voice mail enables callers to leave voice messages for the wireless telephone customer when the wireless customer is unavailable to answer a telephone call completed to the wireless telephone. To dial into the voice mail system and check for voice mail messages, the wireless telephone customer typically dials the MIN assigned to their wireless telephone by sequentially depressing a button (on the wireless telephone's keypad) corresponding to each digit in the MIN.

To simplify the process of dialing into the voice mail system, many wireless telephone customers manually program the MIN into their wireless telephone upon receiving the MIN during OAA. The programming steps typically entail: 1) placing the wireless telephone in a program mode, 2) selecting a memory storage location within the wireless telephone, 3) storing the MIN within the selected memory storage location by sequentially depressing a telephone keypad button which corresponds to each digit within the MIN, and 4) removing the wireless telephone from the program mode. Once the wireless telephone is programmed with the MIN, the customer may dial the MIN to access the voice mail system by depressing a fewer number of telephone keypad buttons (typically one) than the number of telephone keypad buttons corresponding to each digit in the MIN.

Unfortunately, the manual method for programming a MIN into a wireless telephone has a few drawbacks. First, the steps required to program a wireless telephone with a telephone number may not be easily implemented by the telephone customer. In addition, the telephone customer may make mistakes while programming the telephone number into the wireless telephone. As a result of these mistakes, the wrong number may be programmed into the wireless telephone's memory.

Thus, a need exists for a technique which automates the process of programming a wireless telephone with a voice mail system access telephone number.

SUMMARY OF THE INVENTION

The present invention provides a method for automatically programming a wireless telephone with a voice mail system access telephone number. When the voice mail system access telephone number is received by the wireless telephone, software within the wireless telephone automatically stores the received voice mail system access telephone number within a wireless telephone memory location.

DETAILED DESCRIPTION

The present invention automates the process of programming a wireless telephone with a voice mail system access telephone number.

Figure 1:
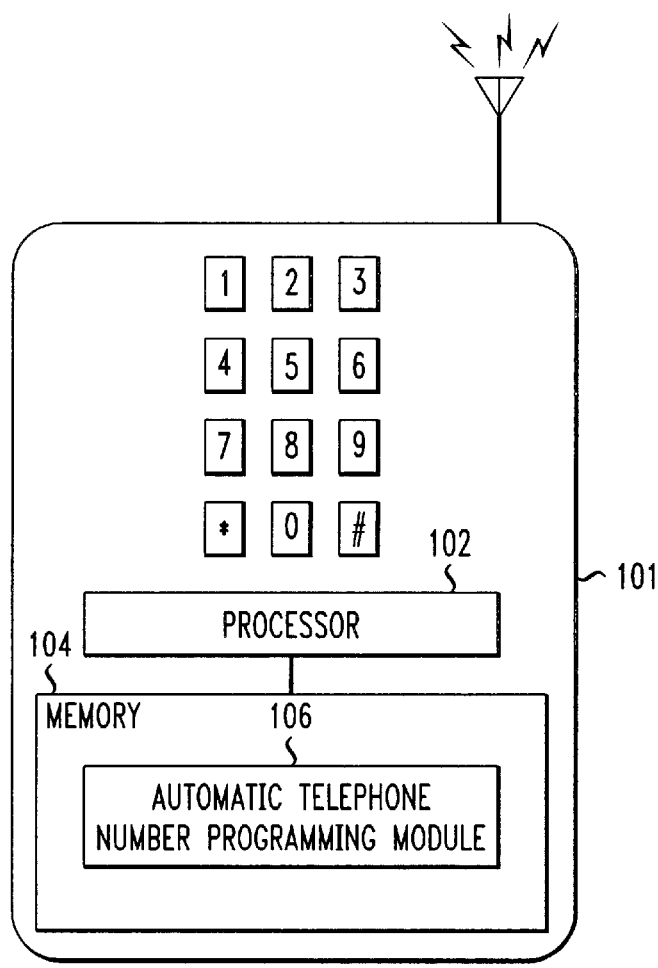
FIG. 1 is a block diagram of a wireless telephone suitable for practicing an embodiment of the present invention.

FIG. 1 is a block diagram of a wireless telephone suitable for practicing an embodiment of the present invention. In FIG. 1, a wireless telephone 101 may be, for example, an Ericsson DH318. Wireless telephone 101 includes a processor 102 adapted to be connected to a computer readable memory segment 104. Computer readable memory segment 104 stores computer program code segments which, when executed by processor 102, implement the main functionality of this embodiment of the invention. These computer program code segments are stored within an automatic telephone number programming module 106. Although in this embodiment of the invention, the computer program code segments are shown in one module, it can be appreciated that this module can be further separated into more modules and still fall within the scope of the invention.

Figure 2:
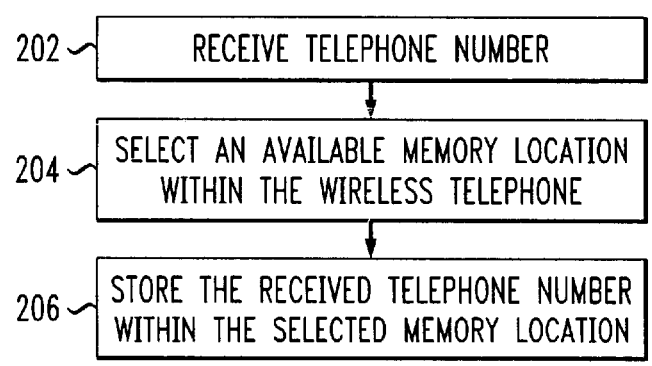
FIG. 2 illustrates a flow chart with steps for automatically programming a wireless telephone with a voice mail system access telephone number in accordance with an embodiment of the present invention.

FIG. 2 illustrates a flow chart with steps for automatically programming a wireless telephone with a voice mail system access telephone number in accordance with an embodiment of the present invention. These steps may be implemented, for example, as a computer program or as computer hardware using well-known signal processing techniques. If implemented in software, the computer program instructions are stored in computer readable memory, such as Read-Only Memory (ROM), Random Access Memory (RAM), magnetic disk (e.g, 3.5" diskette or hard drive), optical disk (e.g., CD-ROM) and so forth. In accordance with one embodiment of the present invention, the computer program instructions are included within an automatic telephone number programming module 106 and executed by processor 102 within wireless telephone 101.

In step 202, wireless telephone 101 receives a voice mail system access telephone number. In a wireless telephone network where a wireless telephone's mobile identification number (MIN) serves as the access number for the voice mail system, this telephone number may be received during an over the air activation (OAA) procedure as described above. After receiving the voice mail system access telephone number, the system proceeds to step 204 and selects an available memory location within the wireless telephone. This memory location may be located, for example, within a computer readable memory segment such as computer readable memory segment 104 described above with reference to FIG. 1. In step 206, the system stores the received voice mail system access telephone number within the selected memory location.

After performing the steps described above with reference to FIG. 2, a wireless telephone has automatically stored a received voice mail system access telephone number within a memory location and a wireless telephone user may then cause the wireless telephone to automatically dial the voice mail system access number by depressing one or more buttons on the wireless telephone's keypad. The wireless telephone user need not understand or perform the process of storing the voice mail system access telephone number within a memory location. Thus, the possibility that the voice mail system access telephone number may be incorrectly programmed into the wireless telephone is reduced. Some known wireless telephones include a predetermined memory location for storing a voice mail system access telephone number and/or a corresponding predetermined button on the wireless telephone's keypad for causing the wireless telephone to dial the stored voice mail system access telephone number.

Although an embodiment is specifically illustrated herein, it will be appreciated that modifications and variations of the present invention are covered by the above teachings and within the purview of the appended claims without departing from the spirit and intended scope of the invention. For example, in addition to receiving a voice mail system access telephone number during an OAA procedure, the wireless telephone may receive the voice mail system access telephone number through a manual activation procedure using a cable adapted to be connected to the wireless telephone or the wireless telephone may receive the voice mail system access telephone number through a manual activation procedure using the wireless telephone's keypad. In addition, the present invention may be modified so the wireless telephone user may designate the specific memory location where the voice mail system access number should be automatically stored.

What is claimed is:

1. A method for automatically programming a wireless telephone with a voice mail system access telephone number, comprising the steps of:
   receiving the voice mail system access telephone number; and
   placing said wireless telephone in an automatic program mode which automatically performs the following steps:
      selecting an available memory location within said wireless telephone,
      storing said received voice mail system access telephone number within said selected available memory location, and
      removing said wireless telephone from said automatic program mode.

2. The method of claim 1, wherein the voice mail system access telephone number is a mobile identification number (MIN) assigned to said wireless telephone; and
   wherein said MIN is received one of after being transmitted through the air, after being sent through a wire, and after being manually entered using a keypad associated with said wireless telephone.

3. The method of claim 1, wherein said selected available memory location is predetermined.

4. A method for automatically programming a wireless telephone with a voice mail system access telephone number, comprising the steps of:
   sending a voice mail system access telephone number from a base station within a wireless telephone network to the wireless telephone;
   receiving the voice mail access telephone number at the wireless telephone; and
   placing said wireless telephone in an automatic program mode which automatically performs the following steps:
      selecting an available memory location within said wireless telephone,
      storing said received voice mail system access telephone number within said selected available memory location, and
      removing said wireless telephone from said automatic program mode.

5. A computer-readable medium whose contents cause a computer system to automatically program a wireless telephone with a voice mail system access telephone number, by performing the steps of:
   receiving the voice mail system access telephone number; and
   placing said wireless telephone in an automatic program mode which automatically performs the following steps:
      selecting an available memory location within said wireless telephone,
      storing said received voice mail system telephone number within said selected available memory location, and
      removing said wireless telephone from said automatic program mode.

6. The computer-readable medium of claim 5, wherein the voice mail system access telephone number is a mobile identification number (MIN) assigned to said wireless telephone; and
   wherein said MIN is received one of after being transmitted through the air, after being sent through a wire, and after being manually entered using a keypad associated with said wireless telephone.

7. The computer-readable medium of claim 5, wherein said selected available memory location is predetermined.

8. An apparatus for automatically programming a wireless telephone with a telephone voice mail system access number, comprising:
   a wireless telephone;
   a processor within said wireless telephone;
   a computer readable memory segment adapted to be connected to said processor; and
   an automatic telephone number programming module, said automatic telephone number programming module comprising computer program code segments which, when executed by said processor, implement the steps of:
      receiving the voice mail system access telephone number; and
      placing said wireless telephone in an automatic program mode which automatically performs the following steps:
         selecting an available memory location within said wireless telephone,
         storing said received voice mail system access telephone number within said selected available memory location, and
         removing said wireless telephone from said automatic program mode.

* * * * *